J. R. LANGLEY.
STARTING SYSTEM FOR AUTOMOBILES.
APPLICATION FILED NOV. 6, 1914.
1,319,013.
Patented Oct. 14, 1919.
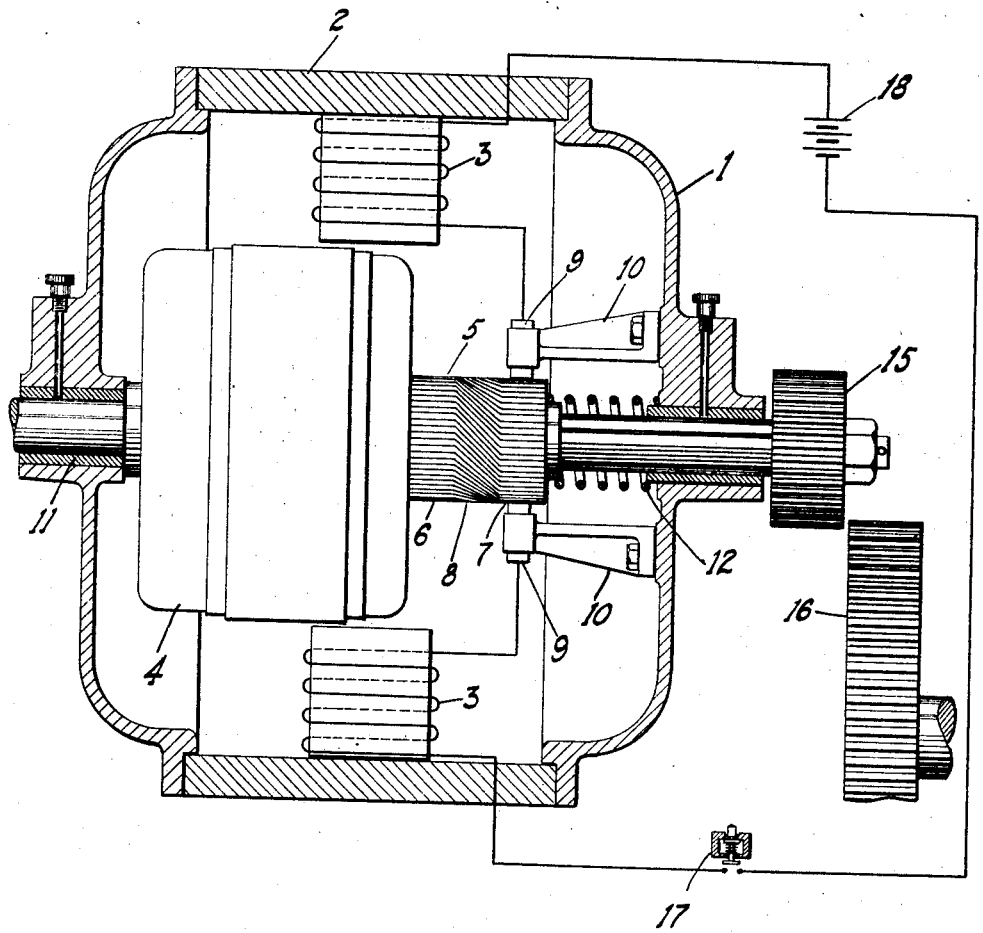
WITNESSES:
Chas. Fornander
R.J. Fitzgerald
INVENTOR
Jesse R. Langley.
BY
ATTORNEY

UNITED STATES PATENT OFFICE.

JESSE R. LANGLEY, OF WILKINSBURG, PENNSYLVANIA, ASSIGNOR TO WESTINGHOUSE ELECTRIC AND MANUFACTURING COMPANY, A CORPORATION OF PENNSYLVANIA.

STARTING SYSTEM FOR AUTOMOBILES.

1,319,013.     Specification of Letters Patent.     Patented Oct. 14, 1919.

Application filed November 6, 1914. Serial No. 870,599.

*To all whom it may concern:*

Be it known that I, JESSE R. LANGLEY, a citizen of the United States, and a resident of Wilkinsburg, in the county of Allegheny and State of Pennsylvania, have invented a new and useful Improvement in Starting Systems for Automobiles, of which the following is a specification.

My invention relates to starting systems for automobiles and it has particular reference to such systems as embody motors that have longitudinally movable armatures for controlling the engagement of coacting gear wheels.

My invention has for its object to provide a motor of the character indicated above which possesses the characteristics of exerting a low torque in the displaced position of the armature and a strong magnetic force to return the armature to its central position.

Motors having displaced armatures have been proposed heretofore, but they possess certain disadvantages in that they require the use of auxiliary switching mechanisms and resistors to prevent rotation of the armatures until coacting gear wheels are placed in mesh. This arrangement is necessary because, in the displaced position of the armature, the torque is sufficiently high to rotate the armature at a comparatively high rate of speed before the gear wheels are completely meshed.

It is also difficult to effect the meshing of the gear wheels when there is considerable lateral pressure between the coacting teeth. When the switching mechanism above described is employed, little or no current traverses the armature winding to produce a torque for rotating the armature, and the gear wheels may be readily meshed because there is little or no lateral pressure between the coacting teeth to retard their relative slidable movements.

I provide an electric motor by means of which the results above described are accomplished without the employment of auxiliary switching mechanism or resistors. The longitudinally slidable armature of an electric motor is provided with a commutator cylinder having two sets of commutator bars that are respectively connected in pairs by curved conductor bars. Each bar of one set is connected to a bar of the other set that is displaced angularly from it by approximately 90 electrical degrees. In the displaced position of the armature, the commutator brushes engage the auxiliary set of bars, the members of which are connected to armature coils displaced by 90° from the coils connected to the respective commutator bars of the main set that are in axial alinement with them and that are engaged by the brushes in the normal position of the armature.

Since the armature coils in circuit in the displaced position of the armature are displaced by approximately 90 electrical degrees, the direction of current through substantially half of the armature coils is reversed. The result is that the magnetic force produced by the armature coils and which reacts upon the field flux to produce rotation of the armature, tends to rotate the armature in both directions with substantially equal and opposite forces. Accordingly, when the motor circuit is closed, the armature does not rotate. In practice, however, the relative displacement of the commutator bars is so arranged that a very small torque is produced in order to facilitate the meshing of the gear wheels.

The details of my invention will be described in connection with the accompanying drawing, in which the single figure is a side view, partially in elevation and partially in section, of a dynamo-electric machine constructed in accordance with my invention and a pair of coacting gear wheels, the electrical connections being diagrammatically shown.

A motor 1 has a field magnet frame 2 which is secured to any suitable stationary part of the automobile (not shown). The motor has any convenient number of poles, a two pole arrangement being illustrated herewith. The poles are provided with series field windings 3. The rotatable portion of the motor comprises a longitudinally movable armature 4 and a commutator cylinder 5 which comprises a main set of commutator bars 6 and an auxiliary set of commutator bars 7. Each bar 6 of the main set is connected by a curved conductor 8 to a bar 7 of the auxiliary set that is angularly displaced from it by approximately 90 electrical degrees. The sets of bars 6 and 7 and the curved connecting bars 8 are so arranged as to present a substantially continuous conducting surface of cylindrical shape. A pair of commutator brushes 9, which coact with the commutator cylinder, are supported by brush holders 10 that are secured to an end bell of the motor.

The armature shaft is arranged for slidable movement in bearings 11. A spring 12, which is interposed between the commutator cylinder and the corresponding end bell of the motor, tends to maintain the armature in a displaced position relatively to the pole pieces, as illustrated. A pinion 15, which is mounted on the armature shaft, coacts with a gear wheel 16 which may be connected in any suitable manner (not shown) to the engine of an automobile. The motor circuit comprises a battery 18 and a suitable switching mechanism, as, for example, a manually operable switch 17.

It may be assumed that the various parts occupy their respective illustrated positions, with the armature in its displaced position and the pinion 15 out of engagement with the gear teeth 16. The commutator brushes 9 are in engagement with the auxiliary set of commutator bars 7. To start the engine, the switch 17 is closed to complete the motor circuit which extends from the battery 18, through the switch 17, series field winding 3, brush 9, commutator bars 7, conductors 8, commutator bars 6, through the armature winding, commutator bars 6, conductors 8, commutator bars 7, brush 9 and series field winding 3 to the battery.

Since the resistance of the motor circuit is very low, a heavy current traverses the motor windings. The field windings 3 energize the field magnet poles to exert a strong magnetic force to shift the armature longitudinally to its central position. Since the brushes 9 are connected through the commutator cylinder to coils displaced by substantially 90 electrical degrees from the coils that are connected in circuit in the normal position of the armature, substantially equal and opposite forces are produced and the armature will rotate very slowly, if at all, while the pinion 15 is being meshed with the gear wheel 16. As the armature moves longitudinally, the brushes 9 will successively engage conductor bars 8 to gradually change the connections to coils having a smaller angular displacement than those initially energized.

When the armature approaches the end of its path of movement, the brushes 9 engage the main set of commutator bars 6. Current then traverses the armature winding through the normal circuit and the normal torque is applied to the pinion 15 to drive the gear wheel 16. When the motor is driving the engine, a very heavy current traverses its windings and the poles are sufficiently energized to retain the armature in its central position against the force of the compression spring 12.

The operator may release the switch 17 as soon as the engine has started under its own power. When the load of the motor is reduced by the operation of the engine under its own power, it will be driven at a rapidly increasing speed. The counter electromotive force of the motor is thereby increased to reduce the current traversing its windings to such a value that the longitudinal pulls exerted by the poles is less than the force of the spring 12, whereupon the armature is shifted to its displaced position, and the pinion 15 is disengaged from the gear wheel 16.

The advantages of a motor constructed in accordance with my invention are that no switching mechanism or resistors are necessary to reduce the torque of the motor while the meshing of the gear wheels is being effected. The connection of the several armature coils is changed gradually without interrupting the motor circuit. These and other advantages will be apparent to those skilled in the art to which my invention appertains.

My invention may be modified in various ways, and it is understood that such changes may be made without departing from the spirit of my invention as fall within the scope of the appended claims.

I claim as my invention:

1. In a starting system, the combination with a field magnet frame, a field magnet winding, a longitudinally movable armature, and an armature winding, of a plurality of commutator brushes in series relation with said armature and field magnet windings, and means for varying the angular relation of said brushes to said armature winding in accordance with the position of said armature.

2. In a starting system, the combination with a field magnet frame, a longitudinally movable armature, and field magnet and armature windings, of a commutator cylinder having two axially alined sets of bars, means for connecting each bar of one set with a bar of the other set that is angularly displaced therefrom, and one set of main commutator brushes for coacting with one of said sets of commutator bars for moving the armature longitudinally and for coacting with the other set of bars for causing rotation of said armature.

3. In a starting system, the combination with a dynamo-electric machine having a longitudinally movable armature, of means for supplying current to the armature at points varying in angular relation thereto in accordance with the longitudinal position of said armature, said means comprising two axially alined sets of commutator bars, the members of each set being connected with a member of the other set that is angularly displaced therefrom.

4. Is a starting system, the combination with a dynamo-electric machine having a longitudinally movable armature, a pinion on the armature shaft, and a gear wheel co-acting with said pinion, of means for supplying current to the armature winding at points varying in angular relation thereto in accordance with the relative positions of said pinion and gear wheel, said means comprising two axially alined sets of commutator bars, the members of each set being connected with a member of the other set that is angularly displaced therefrom.

5. In a starting system, the combination with a field magnet frame, and a longitudinally movable armature therein, of means for supplying current to said armature in its displaced position at points angularly displaced from the normal points of supply and for gradually varying the angle of displacement as said armature assumes its normal position.

In testimony whereof, I have hereunto subscribed my name this 29th day of Oct., 1914.

JESSE R. LANGLEY.

Witnesses:
B. B. HINES,
M. C. MERZ.